United States Patent [19]

Yu

[11] Patent Number: 5,567,996
[45] Date of Patent: Oct. 22, 1996

[54] AC POWER SUPPLY UNIT

[76] Inventor: Shih-Chung Yu, No. 18, Lane179-21, Hsin-Ping Rd., Tai-Ping Hsiang, Taichung Hsien, Taiwan

[21] Appl. No.: 380,180

[22] Filed: Jan. 30, 1995

[51] Int. Cl.$^6$ ................................................. H01H 47/00
[52] U.S. Cl. .......................... 307/125; 307/64; 307/87; 307/150
[58] Field of Search .................................. 307/18, 19, 23, 307/64, 65, 66, 85, 86, 87, 112, 113, 116, 125, 150

[56] References Cited

U.S. PATENT DOCUMENTS

| | | | |
|---|---|---|---|
| 4,673,825 | 6/1987 | Raddi et al. | 307/66 |
| 4,906,859 | 3/1990 | Kobayashi et al. | 307/17 |
| 5,210,685 | 5/1993 | Rosa | 363/109 |

*Primary Examiner*—William M. Shoop, Jr.
*Assistant Examiner*—Jonathan S. Kaplan
*Attorney, Agent, or Firm*—Townsend and Townsend and Crew

[57] ABSTRACT

An ac power supply unit includes first, second and third output terminals. A load is connectable selectively between any two of the output terminals. A dc voltage supply unit supplies a high dc voltage output and has a positive terminal, a center tap terminal connected to the second output terminal, and a ground terminal. A first voltage-controlled switch interconnects the positive terminal of the dc voltage supply unit and the first output terminal. A second voltage-controlled switch interconnects the third output terminal and the ground terminal of the dc voltage supply unit. A third voltage-controlled switch interconnects the positive terminal of the dc voltage supply unit and the third output terminal. A fourth voltage-controlled switch interconnects the first output terminal and the ground terminal of the dc voltage supply unit. A control circuit assembly is connected to the voltage-controlled switches. The control circuit assembly controls the first and second voltage-controlled switches to conduct and the third and fourth voltage-controlled switches to be in a cut-off state during a high cycle of a predetermined frequency cycle and controls the third and fourth voltage-controlled switches to conduct and the first and second voltage-controlled switches to be in a cut-off state during a low cycle of the frequency cycle.

12 Claims, 15 Drawing Sheets

5,567,996

1

AC POWER SUPPLY UNIT

BACKGROUND OF THE INVENTION

1. Field of the Invention

This invention relates to an ac power supply unit, more particularly to a highly efficient ac power supply unit.

2. Description of the Related Art

A conventional ac power supply unit usually includes a high power transformer for an inverter portion of the power supply unit. The high power transformer reduces the efficiency of the ac power supply unit since it consumes a large amount of power. Furthermore, only a 110 V ac voltage output or a 220 V ac voltage output is available in the conventional ac power supply unit, thereby limiting the applicability thereof.

SUMMARY OF THE INVENTION

Therefore, the main objective of the present invention is to provide an ac power supply unit which has a relatively high efficiency.

The second objective of the present invention is to provide an ac power supply unit which can provide a 110 V ac voltage output and a 220 V ac voltage output.

According to the present invention, an ac power supply unit for supplying power to an ac load includes first, second and third output terminals. The load is connectable selectively between any two of the output terminals. A dc voltage supply unit has a positive terminal, a center tap terminal connected electrically to the second output terminal, and a ground terminal. The voltage supply unit supplies a high dc voltage output. A first voltage-controlled switch interconnects the positive terminal of the dc voltage supply unit and the first output terminal. A second voltage-controlled switch interconnects the third output terminal and the ground terminal of the dc voltage supply unit. A third voltage-controlled switch interconnects the positive terminal of the dc voltage supply unit and the third output terminal. A fourth voltage-controlled switch interconnects the first output terminal and the ground terminal of the dc voltage supply unit. A control circuit assembly is connected electrically to the first, second, third and fourth voltage-controlled switches. The control circuit assembly controls the first and second voltage-controlled switches to conduct and the third and fourth voltage-controlled switches to be in a cut-off state during a high cycle of a predetermined frequency cycle and further controls the third and fourth voltage-controlled switches to conduct and the first and second voltage-controlled switches to be in a cut-off state during a low cycle of the frequency cycle, thereby providing a first ac voltage output between the first and second output terminals when the load is connected between the first and second output terminals, a second ac voltage output which is equal to and which is in phase with the first ac voltage output and which is between the second and third output terminals when the load is connected between the second and third output terminals, and a third ac voltage output which is equal to a sum of the first and second ac voltage outputs and which is between the first and third output terminals when the load is connected between the first and third output terminals.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
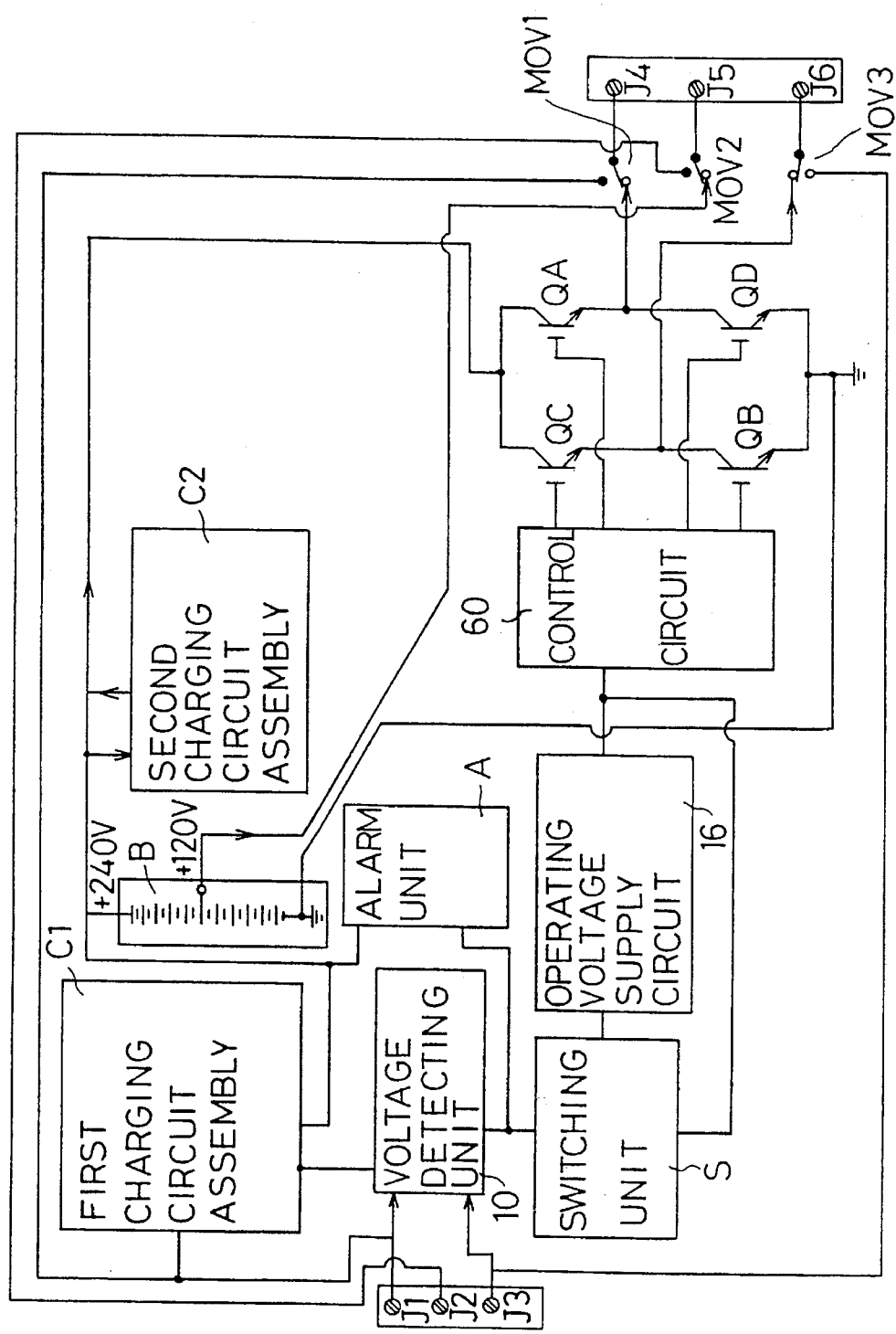
FIG. 1 is a schematic block diagram illustrating an ac power supply unit according to the present invention.

Referring to FIG. 1, an ac power supply unit according to the present invention includes a first output terminal (J4), a second output terminal (J5), a third output terminal (J6), a dc voltage supply unit (B), a first voltage-controlled switch (QA), a second voltage-controlled switch (QB), a third voltage-controlled switch (QC), a fourth voltage-controlled switch (QD), a control circuit 60, an operating voltage supply circuit 16, a first charging circuit assembly (C1), a second charging circuit assembly (C2), a voltage detecting circuit 10, a switching unit (S), and an alarm unit (A).

The dc voltage supply unit (B) supplies a high dc voltage output. In the present embodiment, the voltage supply unit (B) is a rechargeable battery unit and is chargeable up to 240 V. The voltage supply unit (B) has a positive terminal, a center tap terminal which is connected electrically to the second output terminal (J5), and a ground terminal.

The first voltage-controlled switch (QA), such as a transistor, has a base terminal, a collector terminal connected electrically to the positive terminal of the dc voltage supply unit (B), and an emitter terminal connected electrically to the first output terminal (J4). The first voltage-controlled switch (QA) is controlled to conduct during a high cycle of a predetermined frequency cycle and is controlled to be in a cut-off state during a low cycle of the frequency cycle.

The second voltage-controlled switch (QB), such as a transistor, has a base terminal, a collector terminal connected electrically to the third output terminal (J6), and an emitter terminal connected electrically to the ground terminal of the dc voltage supply unit (B). The second voltage-controlled switch (QB) is controlled to conduct during the high cycle of the predetermined frequency cycle and is controlled to be in a cut-off state during the low cycle of the frequency cycle.

The third voltage-controlled switch (QC), such as a transistor, has a base terminal, a collector terminal connected electrically to the positive terminal of the dc voltage supply unit (B), and an emitter terminal connected electrically to the third output terminal (J6). The third voltage-controlled switch (QC) is controlled to be in a cut-off state during the high cycle of the predetermined frequency cycle and is controlled to conduct during the low cycle of the frequency cycle.

The fourth voltage-controlled switch (QD), such as a transistor, has a base terminal, a collector terminal connected electrically to the first output terminal (J4), and an emitter terminal connected electrically to the ground terminal of the dc voltage supply unit (B). The fourth voltage-controlled switch (QD) is controlled to be in a cut-off state during the high cycle of the predetermined frequency cycle and is controlled to conduct during the low cycle of the frequency cycle.

Figure 2:
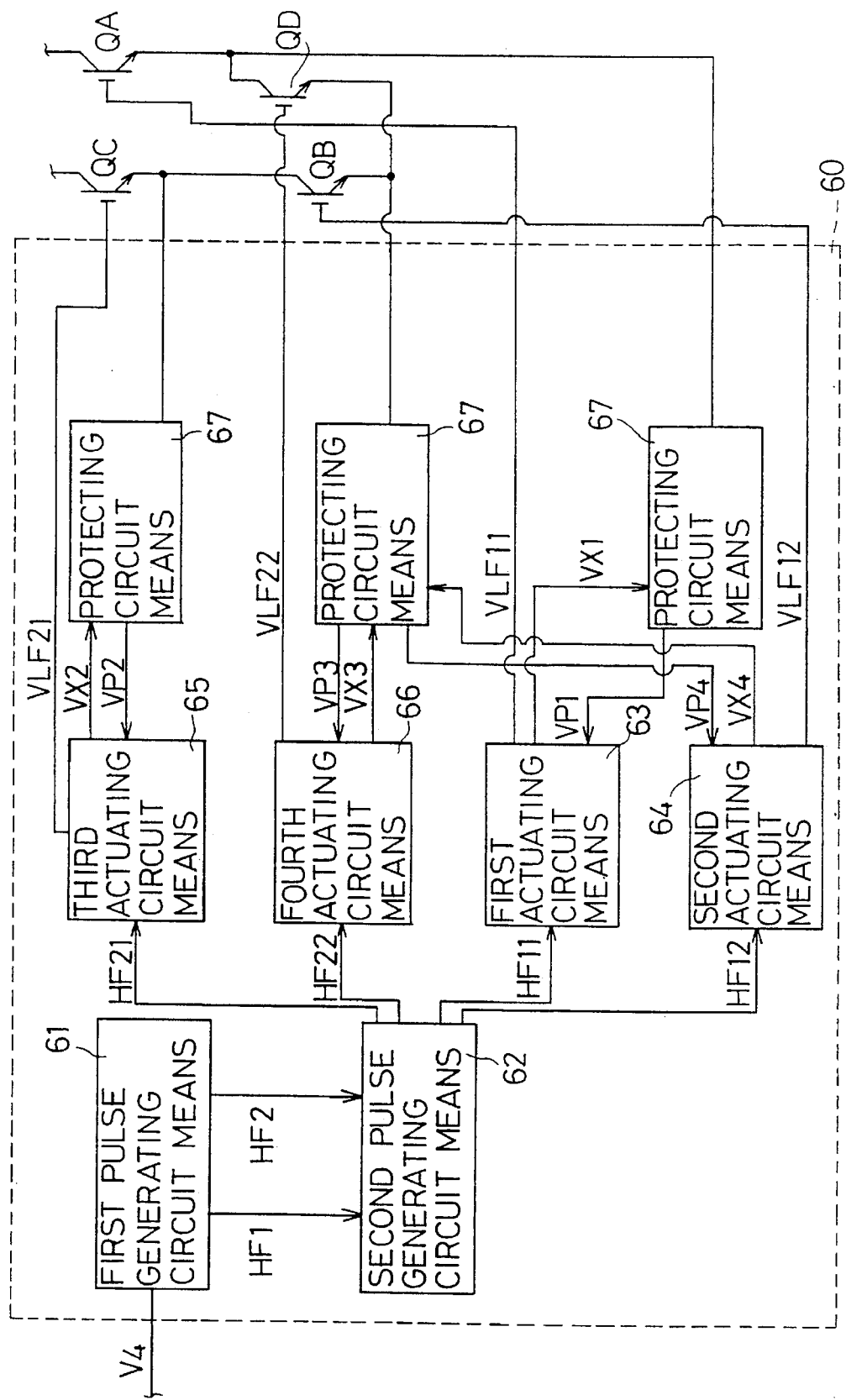
FIG. 2 is a schematic block diagram illustrating the relationship between a control circuit and voltage-controlled switches of the ac power supply unit according to the present invention.
Figure 10A:
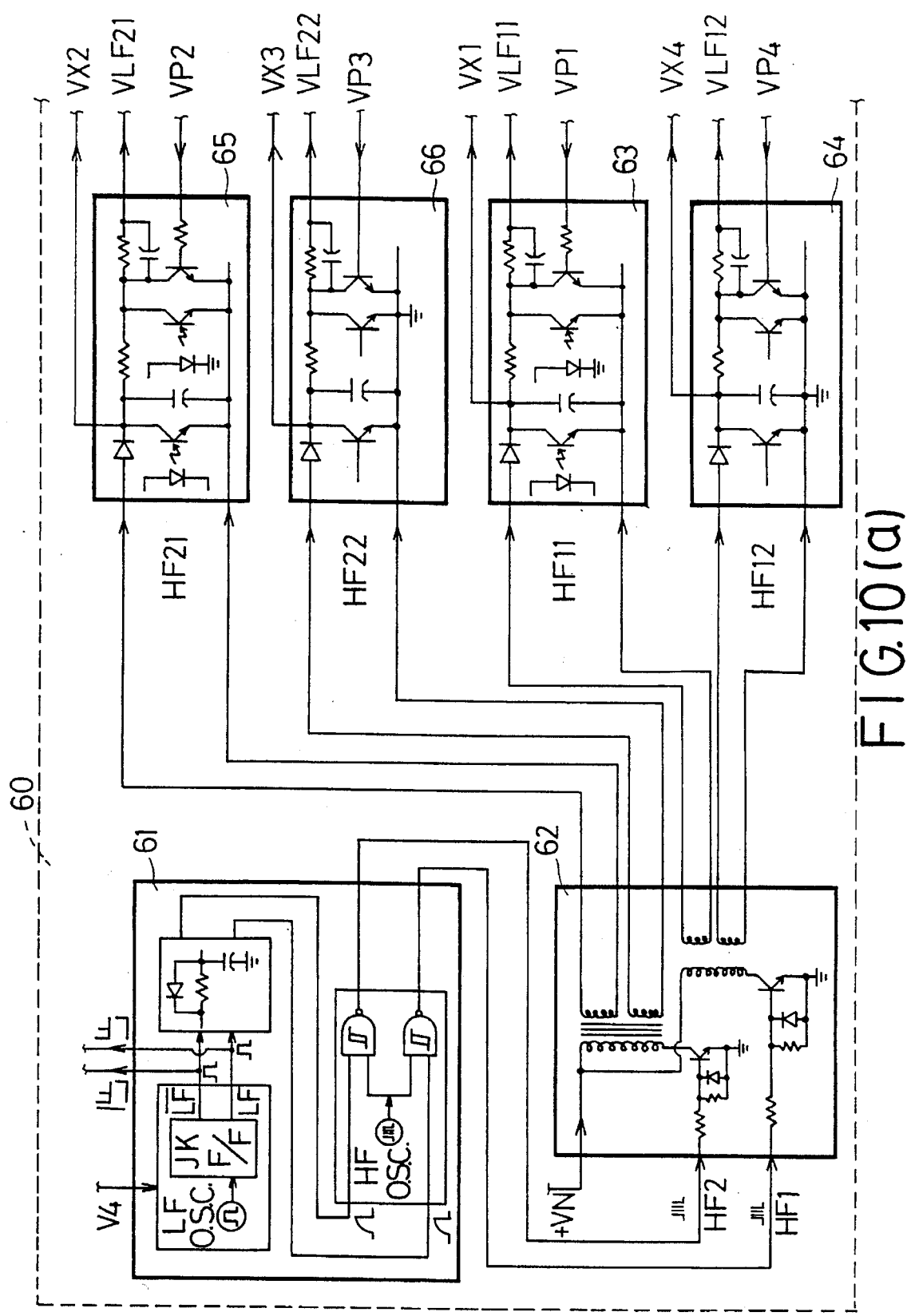
FIGS. 10a and 10b are circuit diagrams illustrating the control circuit and the voltage-controlled switches shown in FIG. 2.
Figure 10B:
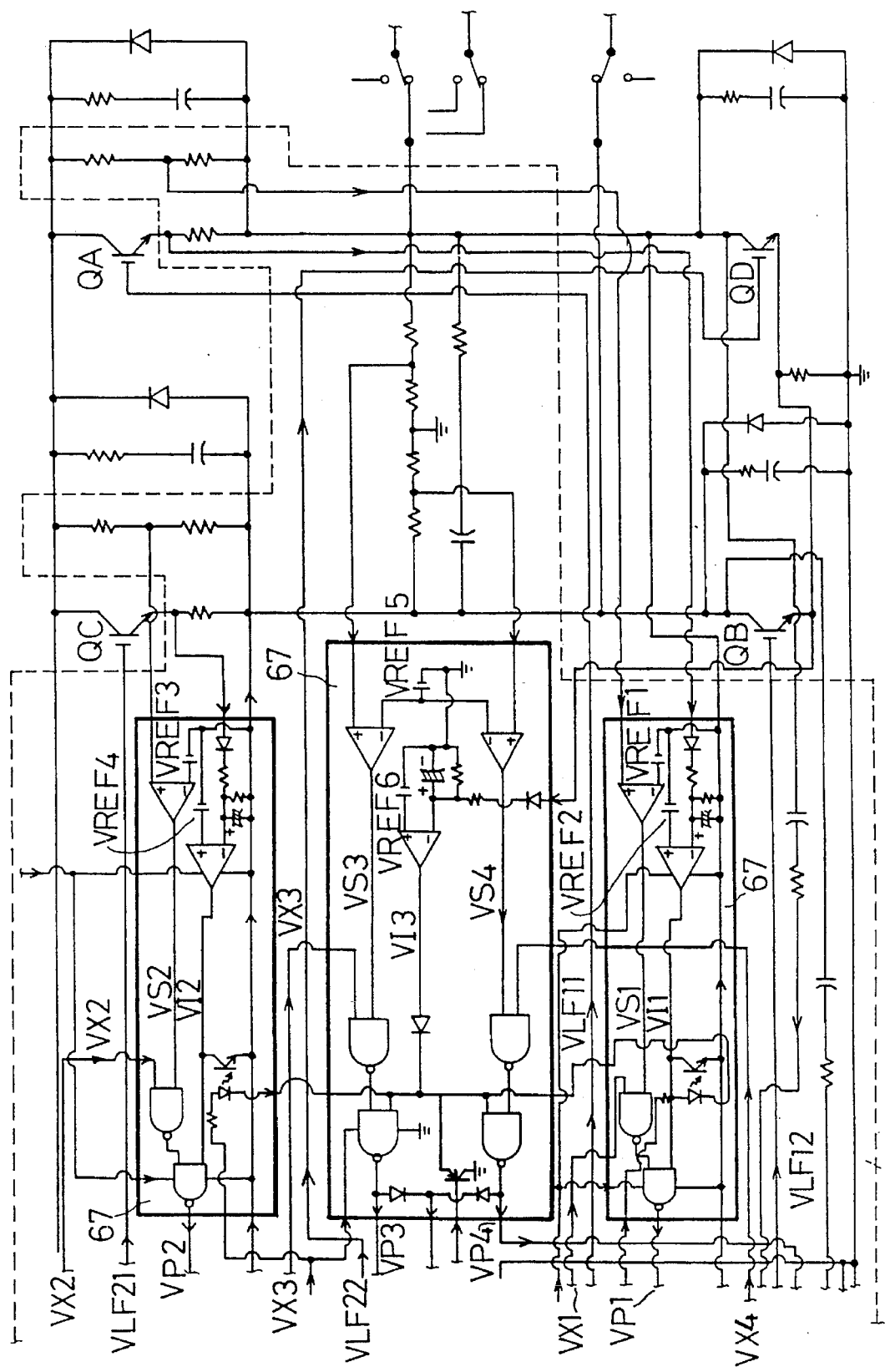

The control circuit 60 is connected electrically to the base terminals of the first, second, third and fourth voltage-controlled switches (QA,QB,QC and QD). As best shown in FIGS. 2 and 10, the control circuit 60 includes a first pulse generating circuit means 61, a second pulse generating circuit means 62, a first actuating circuit means 63, a second actuating circuit means 64, a third actuating circuit means 65, a fourth actuating circuit means 66, and three protecting circuits 67.

Figure 3:
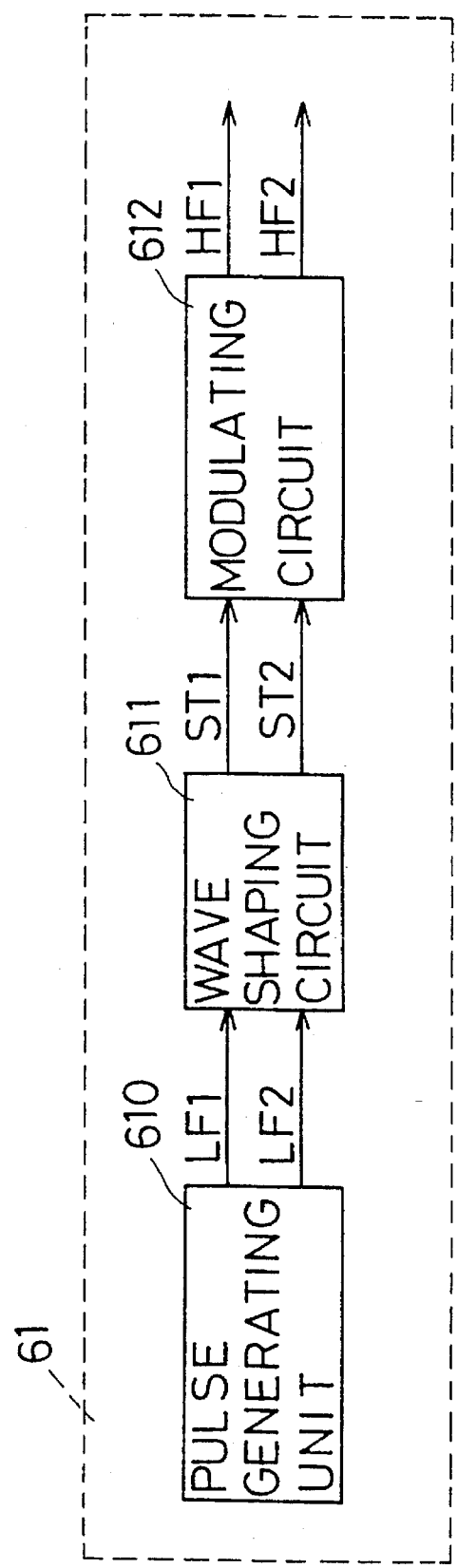
FIG. 3 is a schematic block diagram showing a first pulse generating circuit means of the control circuit of the ac power supply unit according to the present invention.

As best shown in FIG. 3, the first pulse generating circuit means 61 includes a pulse generating unit 610, a wave shaping circuit 611 and a modulating circuit 612. The pulse generating unit 610 generates a first low frequency pulse signal (LF1) and a second low frequency pulse signal (LF2) which is out of phase with respect to the first low frequency pulse signal (LF1). The wave shaping circuit 611 is connected electrically to the pulse generating unit 610. The wave shaping circuit 611 shapes the first and second low frequency pulse signals (LF1 and LF2) into first and second generally saw-tooth like signals (ST1 and ST2). The modulating circuit 612 is connected electrically to the wave shaping circuit 611. The modulating circuit 612 receives the first and second generally saw-tooth like signals (ST1 and ST2) and generates a first high frequency pulse signal (HF1) and a second high frequency pulse signal (HF2) which is out of phase with respect to the first high frequency pulse signal (HF1).

The second pulse generating circuit means 62 receives the first and second high frequency pulse signals (HF1 and HF2) and generates a first high frequency sub-signal (HF11) and a second high frequency sub-signal (HF12) from the first high frequency pulse signal (HF1), and a first high frequency sub-signal (HF21) and a second high frequency pulse signal (HF22) from the second high frequency pulse signal (HF2). The first high frequency sub-signal (HF11) generated from the first high frequency pulse signal (HF1) is out of phase with respect to the first high frequency sub-signal (HF21) generated from the second high frequency pulse signal (HF2). The second high frequency sub-signal (HF12) generated from the first high frequency pulse signal (HF1) is out of phase with respect to the second high frequency sub-signal (HF22) generated from the second high frequency pulse signal (HF2).

The first actuating circuit means 63 is connected electrically to the second pulse generating circuit means 62 and the base terminal of the first voltage-controlled switch (QA). The first actuating circuit means 63 receives the first high frequency sub-signal (HF11) generated from the first high frequency pulse signal (HF1) and generates a first low frequency actuating signal (VLF1) which has a frequency equal to that of the predetermined frequency cycle for activating the first voltage-controlled switch (QA).

The second actuating circuit means 64 is connected electrically to the second pulse generating circuit means 62 and the base terminal of the second voltage-controlled switch (QB). The second actuating circuit means 64 receives the second high frequency sub-signal (HF12) generated from the first high frequency pulse signal (HF1) and generates a second low frequency actuating signal (VLF2) which has a frequency equal to that of the predetermined frequency cycle for activating the second voltage-controlled switch (QB).

The third actuating circuit means 65 is connected electrically to the second pulse generating circuit means 62 and the base terminal of the third voltage-controlled switch (QC). The third actuating circuit means 65 receives the first high frequency sub-signal (HF21) generated from the second high frequency pulse signal (HF2) and generates a third low frequency actuating signal (VLF3) which has a frequency equal to that of the predetermined frequency cycle for activating the third voltage-controlled switch (QC). The third low frequency actuating signal (VLF3) is out of phase with respect to the first low frequency actuating signal (VLF1).

The fourth actuating circuit means 66 is connected electrically to the second pulse generating circuit means 62 and the base terminal of the fourth voltage-controlled switch (QD). The fourth actuating circuit means 66 receives the second high frequency sub-signal (HF22) generated from the second high frequency pulse signal (HF2) and generates a fourth low frequency actuating signal (VLF4) which has a frequency equal to that of the predetermined frequency cycle for activating the fourth voltage-controlled switch (QD). The fourth low frequency actuating signal (VLF4) is out of phase with respect to the second low frequency actuating signal (VLF2).

Figure 4:
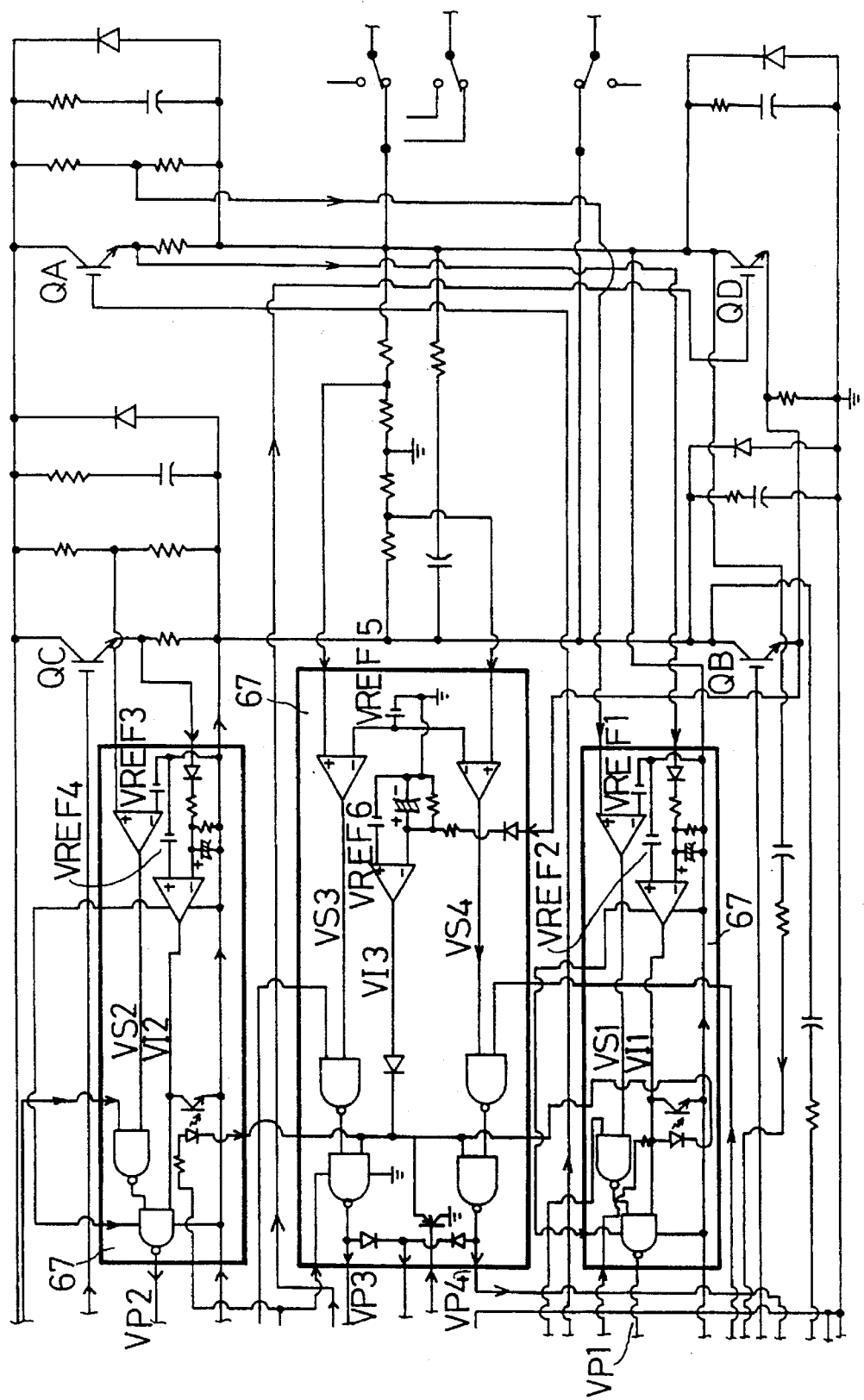
FIG. 4 is a schematic circuit diagram showing the relationship between a protecting circuit means and the voltage-controlled switches of the ac power supply unit according to the present invention.

As best shown in FIGS. 2, 4 and 10, each of the protecting circuit means 67 includes a first comparing circuit and a second comparing circuit. The first comparing circuit of a first one of the protecting circuit means 67 is connected electrically to the first voltage-controlled switch (QA) and the first actuating circuit means 63. The first comparing circuit of the first one of the protecting circuit means 67 compares a terminal voltage (VS1) present at the first voltage-controlled switch (QA) with a first predetermined reference voltage signal (VREF1) and generates a first disabling signal (VP1) to deactivate the first actuating circuit means 63 when an excessive voltage condition is present at the first voltage-controlled switch (QA). The second comparing circuit of the first one of the protecting circuit means 67 is connected electrically to the first voltage-controlled switch (QA). The second comparing circuit of the first one of the protecting circuit means 67 includes means for draining a portion of current (VI1) through the first voltage-controlled switch (QA) and for generating a control voltage corresponding to the drained portion of current (VI1), and means for comparing the control voltage with a second predetermined reference voltage signal (VREF2) and for generating a second disabling signal to deactivate the first actuating circuit means 63 when the control voltage is larger than the second predetermined reference voltage signal (VREF2) for a predetermined time interval, preferably two seconds.

Similarly, the first comparing circuit of a second one of the protecting circuit means 67 is connected electrically to the third voltage-controlled switch (QC) and the third actuating circuit means 65. The first comparing circuit of the second one of the protecting circuit means 67 compares a terminal voltage (VS2) present at the third voltage-controlled switch (QC) with a third predetermined reference voltage signal (VREF3) and generates a first disabling signal (VP2) to deactivate the third actuating circuit means 65 when an excessive voltage condition is present at the third voltage-controlled switch (QC). The second comparing circuit of the second one of the protecting circuit means 67 is connected electrically to the third voltage-controlled switch (QC). The second comparing circuit of the second one of the protecting circuit means 67 includes means for draining a portion of current (VI2) through the third voltage-controlled switch (QC) and for generating a control voltage corresponding to the drained portion of current (VI2), and means for comparing the control voltage with a fourth predetermined reference voltage signal (VREF4) and for generating a second disabling signal to deactivate the third actuating circuit means 65 when the control voltage is larger than the fourth predetermined reference voltage signal (VREF4) for a predetermined time interval, preferably two seconds.

Furthermore, the first comparing circuit of a third one of the protecting circuit means 67 is connected electrically to the second and fourth voltage-controlled switches (Q2 and Q4) and the second and fourth actuating circuit means (64 and 66). The first comparing circuit of the third one of the protecting circuit means 67 compares a terminal voltage (VS3) present at the second voltage-controlled switch (QB) with a fifth predetermined reference voltage signal (VREF5) and compares a terminal voltage (VS4) present at the fourth voltage-controlled switch (QD) with the fifth predetermined reference voltage signal (VREF5). The first comparing circuit of the third one of the protecting circuit means 67 generates a first disabling signal (VP3,VP4) to deactivate the actuating circuit means (64,66) when an excessive voltage condition is present at the voltage-controlled switches (QB and QD). The second comparing circuit of the third one of the protecting circuit means 67 is connected electrically to the second and fourth voltage-controlled switches (QB and QD). The second comparing circuit of the third one of the protecting circuit means 67 includes means for draining a portion of current (VI3) through the voltage-controlled switch (QB,QD) and for generating a control voltage corresponding to the drained portion of current (VI3), and means for comparing the control voltage with a sixth predetermined reference voltage signal (VREF6) and for generating a second disabling signal to deactivate the actuating circuit means (64,66) when the control voltage is larger than the sixth predetermined reference voltage signal (VREF6) for a predetermined time interval, preferably two seconds.

Figure 5:
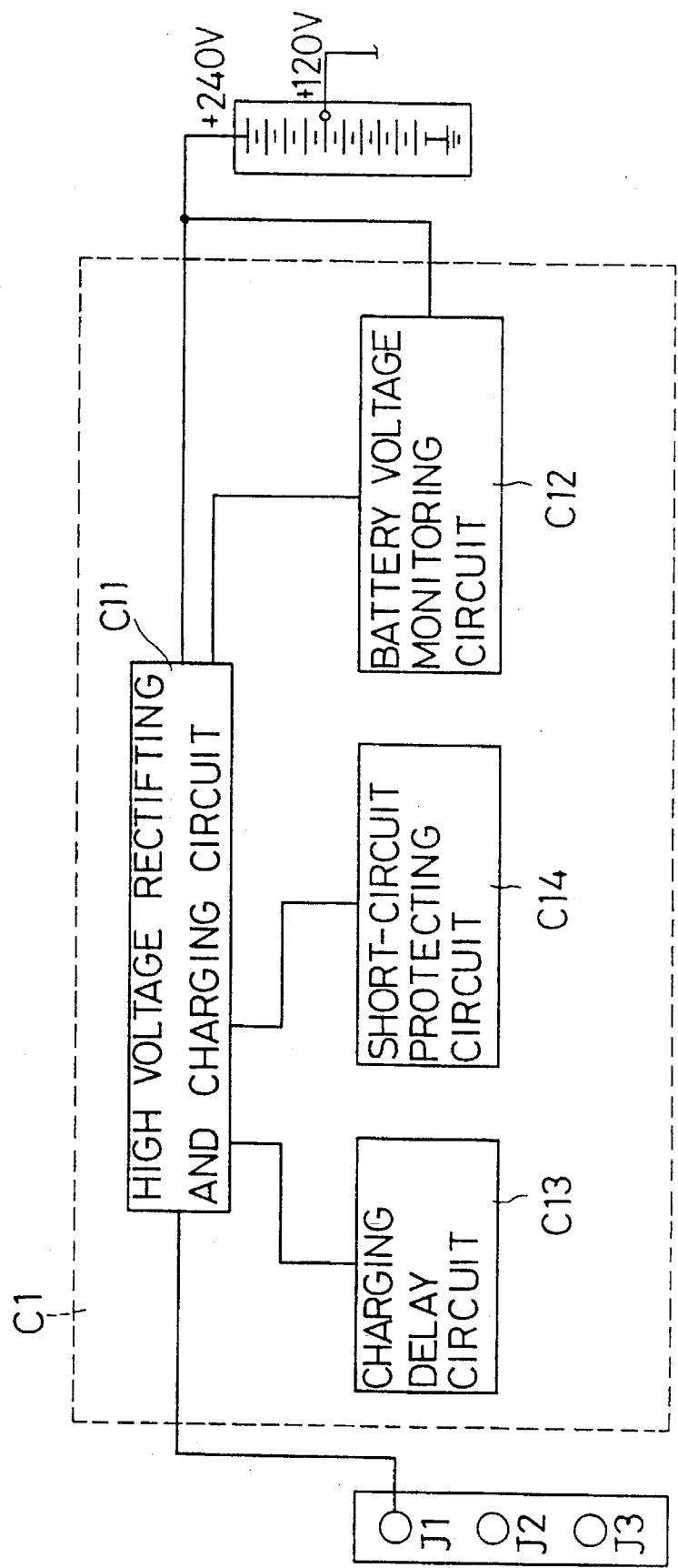
FIG. 5 is a schematic block diagram illustrating a first charging circuit assembly (C1) of the ac power supply unit according to the present invention.
Figure 11:
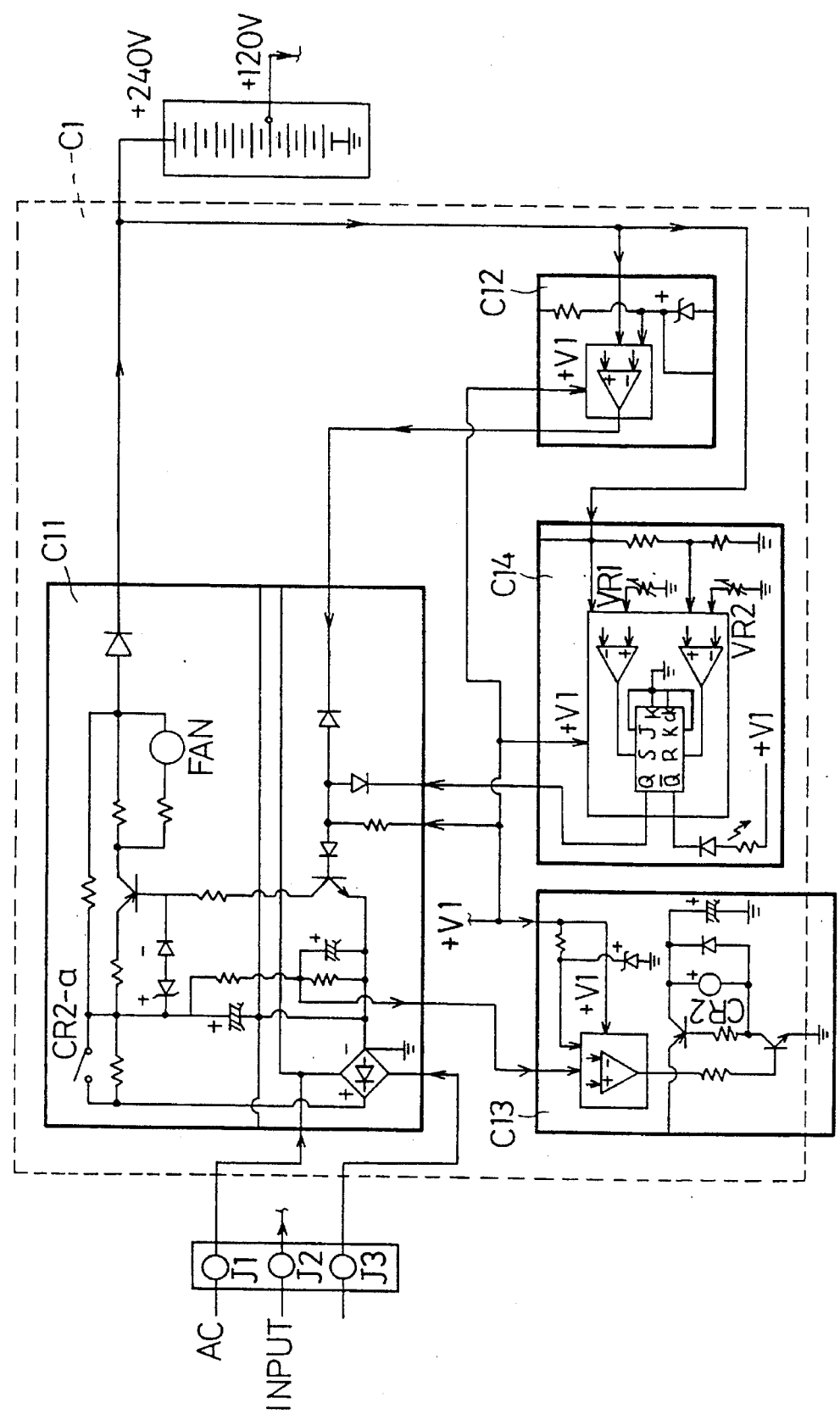
FIG. 11 is a circuit diagram illustrating the first charging circuit assembly (C1) shown in FIG. 5.

As best shown in FIGS. 5 and 11, the first charging circuit assembly (C1) is connectable electrically to an ac outlet for charging the rechargeable battery unit (B). The first charging circuit assembly (C1) includes a high voltage rectifying and charging circuit (C11), a battery voltage monitoring circuit (C14), a charging delay circuit (C13) and a short-circuit protecting circuit (C12). The high voltage rectifying and charging circuit (C11) is connectable to the rechargeable battery unit (B) and converts an ac voltage output from the ac outlet into a dc voltage output for charging the rechargeable battery unit (B). The battery voltage monitoring circuit (C14) is connected electrically to the (C11) and the rechargeable battery unit (B). The battery voltage monitoring circuit (C14) deactivates the high voltage rectifying and charging circuit (C11) when the voltage of the rechargeable battery unit (B) reaches a predetermined value. The charging delay circuit (C13) and the short-circuit protecting circuit (C12) are connected electrically to the high voltage rectifying and charging circuit (C11) and are used to prevent the high voltage rectifying and charging circuit (C11) from burnout and short-circuit. Since the charging delay circuit (C13) and the short-circuit protecting circuit (C12) are known in the art, a detailed description will be omitted herein.

Referring once more to FIG. 1, the ac outlet includes a first terminal (J1) to which the first output terminal (J4) and the high voltage rectifying and charging circuit (C11) are connectable electrically, a second terminal (J2) to which the second output terminal (J5) is connectable electrically, and a third terminal (J3) to which the third output terminal (J6) is connectable electrically. The first and second terminals (J1 and J2) have a first voltage output therebetween. The second and third terminals (J2 and J3) have a second voltage output therebetween. The first and third terminals (J1 and J3) have a third voltage output therebetween. The second voltage is in phase with the first voltage. The third voltage is equal to a sum of the first and second voltages. In the present embodiment, the first and second voltage outputs are 110 V, and the third voltage output is 220 V.

The voltage detecting circuit 10 is connectable electrically between the first and third terminals (J1 and J3) of the ac outlet for detecting whether the line power is present or not.

Figure 6:
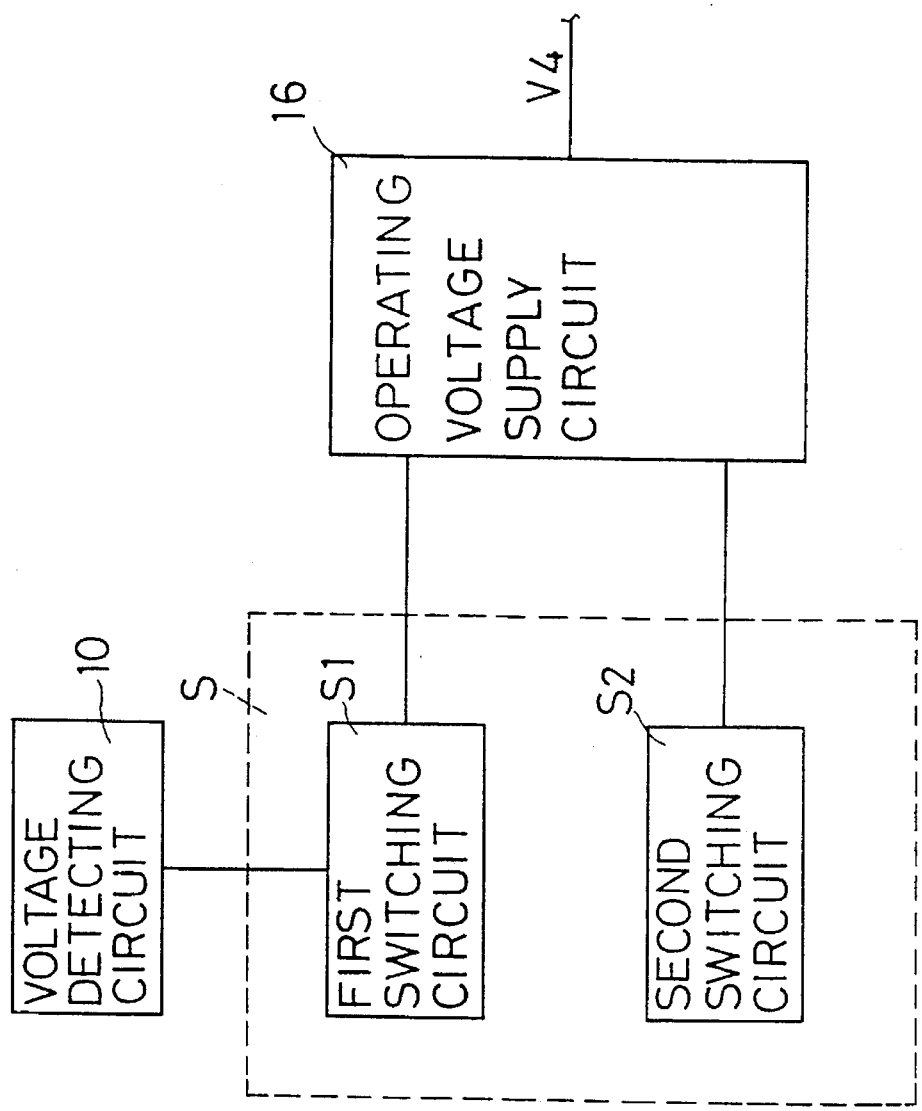
FIG. 6 is a schematic block diagram showing the relationship among a voltage detecting circuit, a switching unit and an operating voltage supply circuit of the ac power supply unit according to the present invention.
Figure 12:
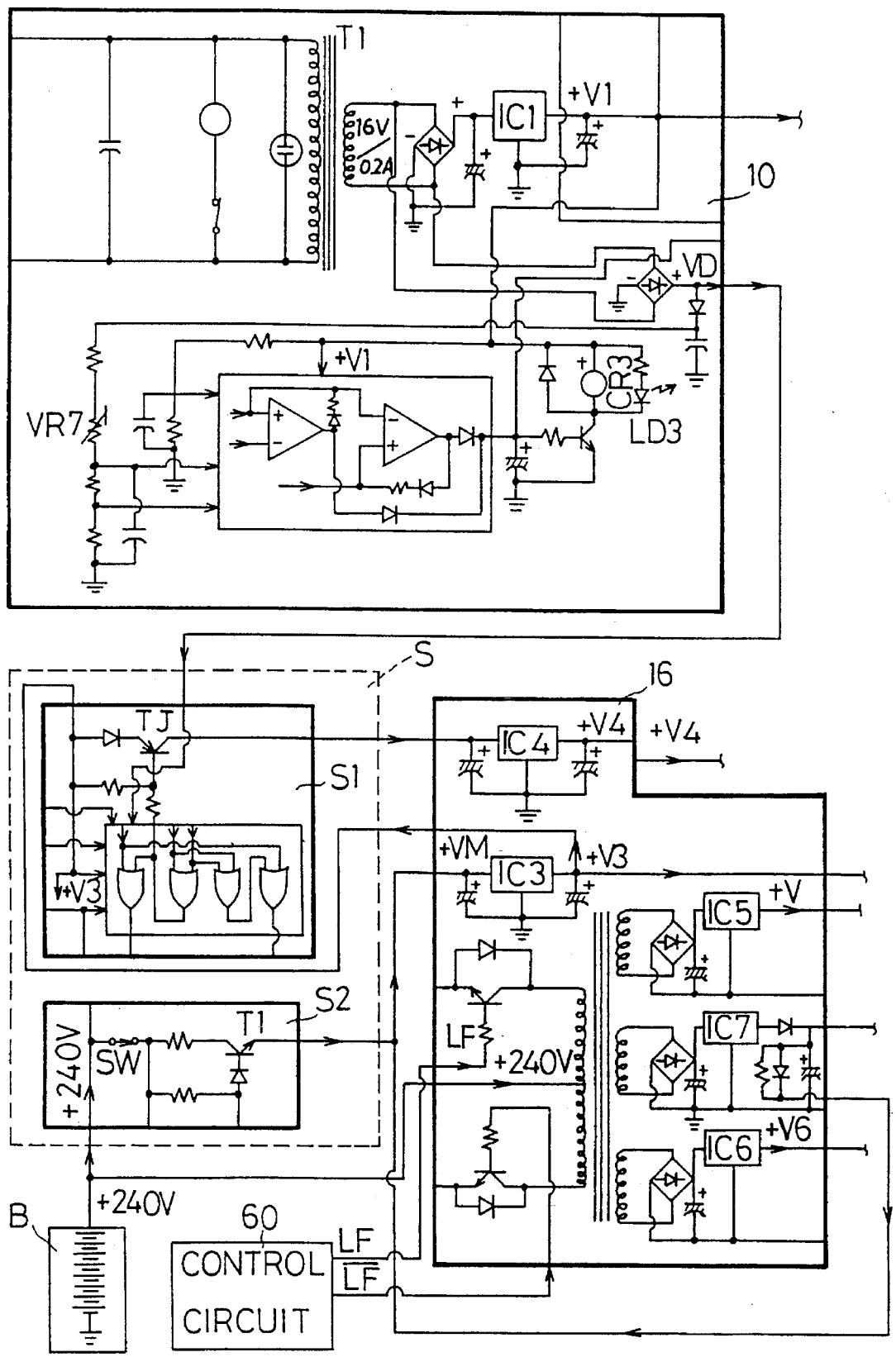
FIG. 12 is a circuit diagram illustrating the voltage detecting circuit, the switching unit and the operating voltage supply circuit shown in FIG. 6.

As best shown in FIGS. 1, 6 and 12, the switching unit (S) includes a first switching circuit (S1) and a second switching circuit (S2). The first switching circuit (S1) is connected electrically to the voltage detecting circuit 10 and controls the movable contacts (MOV1,MOV2,MOV3) to connect selectively the first output terminal (J4) to the first terminal (J1) of the ac outlet, the second output terminal (J5) to the second terminal (J2) of the ac outlet and the third output terminal (J6) to the third terminal (J3) of the ac outlet when the line power is present. On the other hand, the first switching circuit (S1) controls the movable contacts (MOV1,MOV2,MOV3) to connect the center tap terminal of the battery unit (B) to the second output terminal (J5), the first and fourth voltage-controlled switches (QA and QD) to the first output terminal (J4) and the second and third voltage-controlled switches (QB and QC) to the third output terminal (J6) when the line power is absent. The function of the second switching circuit (S2) is similar to that of the first switching circuit (S1). However, the second switching circuits (S2) is a manual override switch that can be activated manually.

The operating voltage supply circuit 16 is connected electrically to the first pulse generating circuit means 61 to supply an operating voltage (V4) thereto. It should be noted that the operating voltage supply circuit 16 is also connected electrically to the first and second switching circuits (S1 and S2) such that the supply of the operating voltage (V4) is controlled by the first and second switching circuits (S1 and S2). That is, the first and second switching circuit (S1 and S2) can be enabled to deactivate the operating voltage supply circuit 16 to stop the supply of the operating voltage (V4) to the first pulse generating circuit means 61 so as to disable the first, second, third and fourth voltage-controlled switches (QA,QB,QC and QD). The second comparing circuits of the protecting circuit means 67 are connected electrically to the operating voltage supply circuit 16 via the first switching circuit (S1) and control the operating voltage supply circuit 16 to stop the supply of the operating voltage (V4) to the first pulse generating circuit means 61 so as to disable the first, second, third and fourth voltage-controlled switches (QA,QB,QC and QD) when the control voltage of one of the voltage-controlled switches (QA,QB,QC and QD) is larger than the corresponding predetermined reference voltage signal (VREF2,VREF4,VREF6) for the predetermined time interval.

Figure 7:
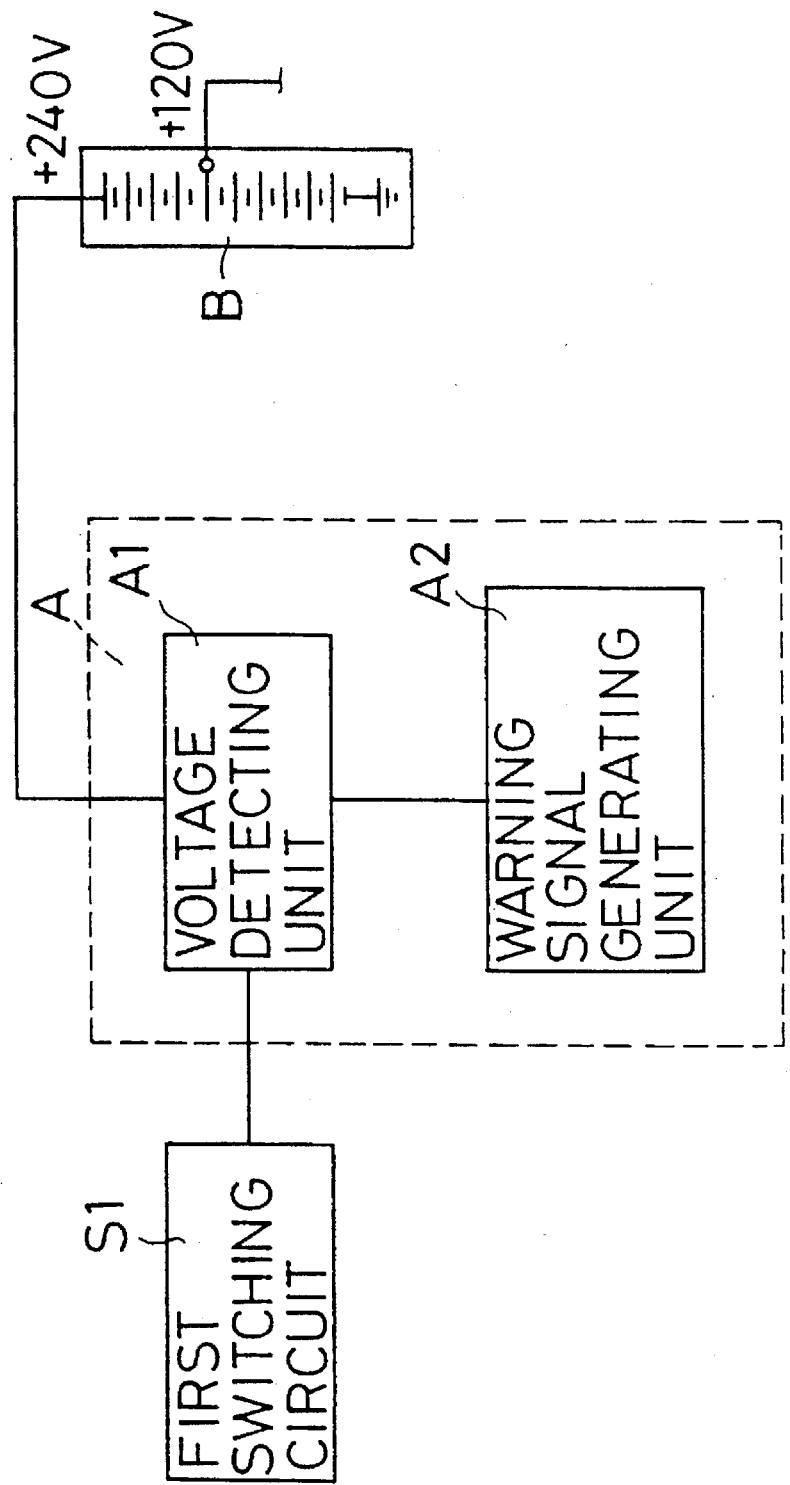
FIG. 7 is a schematic block diagram showing the relationship between an alarm unit and the switching unit of the ac power supply,unit according to the present invention.
Figure 13:
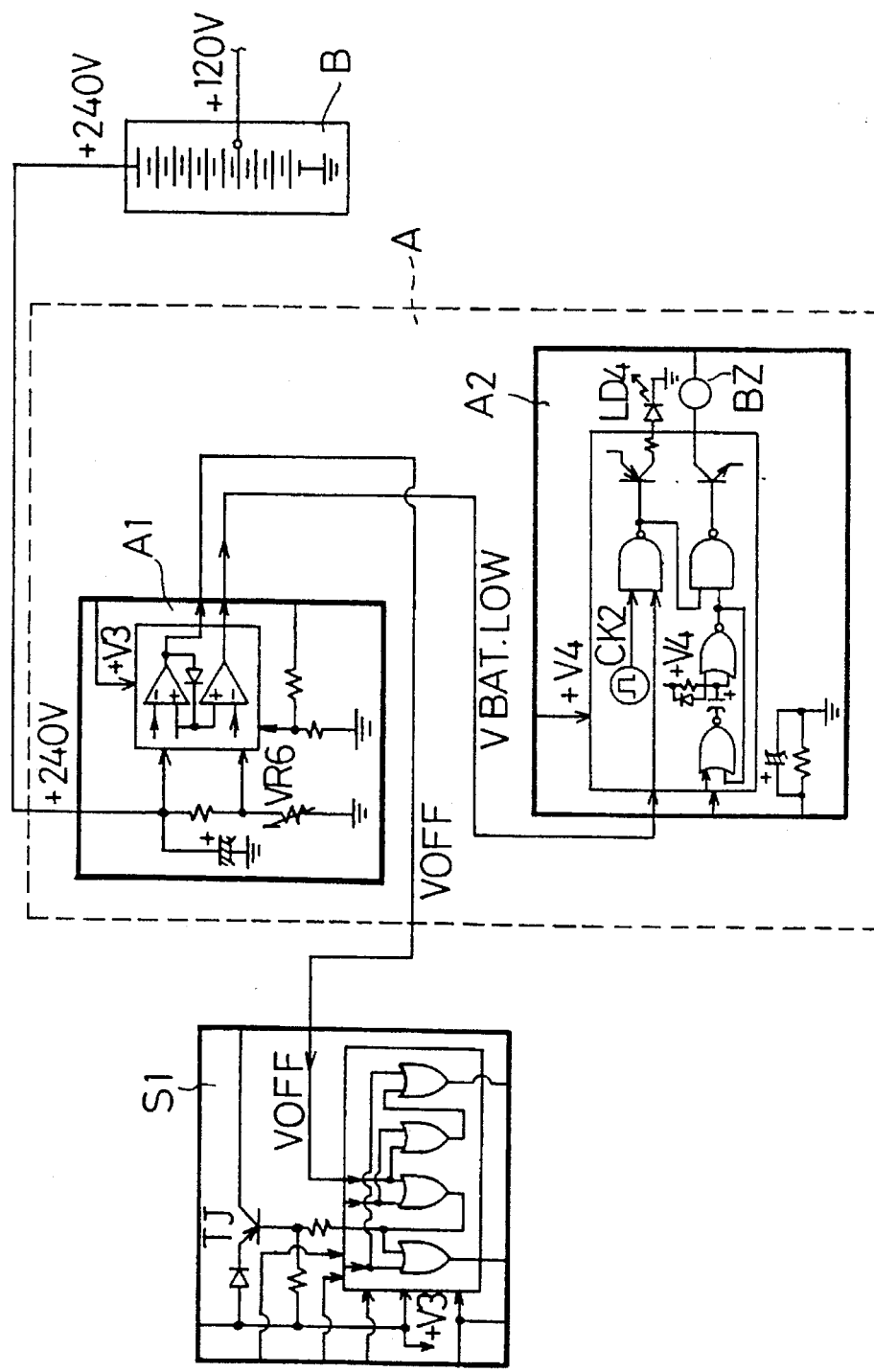
FIG. 13 is a circuit diagram illustrating the alarm unit and the switching unit shown in FIG. 7.

As best shown in FIGS. 1, 7 and 13, the alarm unit (A) includes a voltage detecting unit (A1) and a warning signal generating unit (A2). The voltage detecting unit (A1) is connected electrically to the positive terminal of the battery unit (B) for detecting the voltage of the battery unit (B) and is connected electrically to the first switching circuit (S1). The warning signal generating unit (A2) is connected electrically to the voltage detecting unit (A1). The warning signal generating unit (A2) generates a warning signal when the line power is interrupted and the voltage of the rechargeable battery unit (B) drops below a minimum level.

Figure 8:
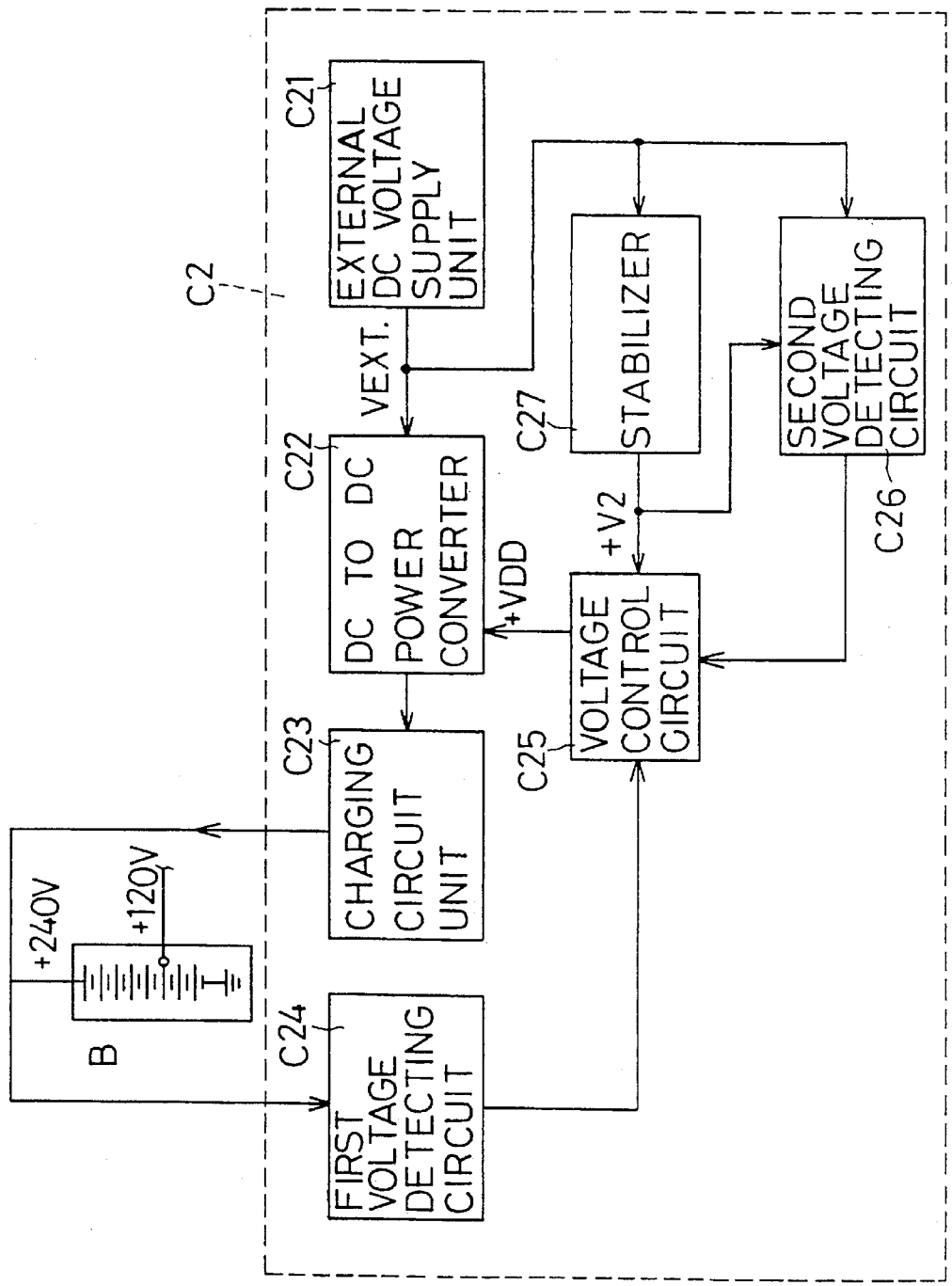
FIG. 8 is a schematic block diagram illustrating a second charging circuit assembly of the ac power supply unit according to the present invention.
Figure 14:
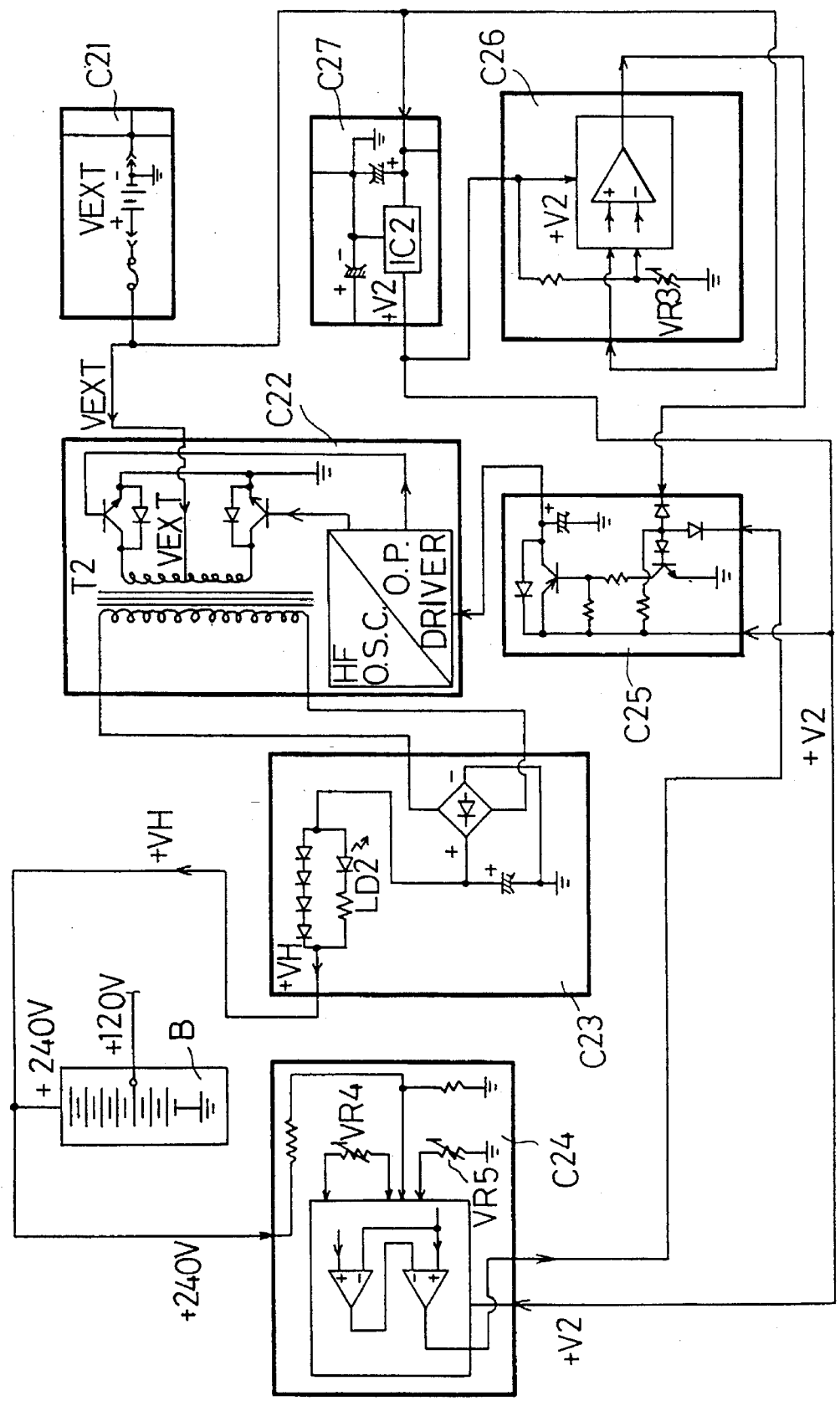
FIG. 14 is a circuit diagram illustrating the second charging circuit assembly shown in FIG. 8.

Referring now to FIGS. 1, 8 and 14, the second charging circuit assembly (C2) includes an external dc voltage supply unit (C21) for supplying a low dc voltage output, a dc-to-dc power converter (C22), a charging circuit unit (C23), a first voltage detecting circuit (C24), a voltage control circuit (C25), a second voltage detecting circuit (C26), and a stabilizer (C27). In the present embodiment, the external dc voltage supply unit (C21) may be an automobile battery or a solar cell. The power converter (C22) is connected electrically to the external dc voltage supply unit (C21) for amplifying the low dc voltage output into a high dc voltage output. The charging circuit unit (C23) is connected electrically to the power converter (C22) and the rechargeable battery unit (B) so as to charge the rechargeable battery unit (B) with the high dc voltage output. The first voltage detecting circuit (C24) is connected electrically to the rechargeable battery unit (B) for detecting voltage level of the rechargeable battery unit (B). The voltage control circuit (C25) is connected electrically to the first voltage detecting circuit (C24) and the power converter (C22). The voltage control circuit (C25) is enabled to deactivate the power converter (C22) when the rechargeable battery unit (B) is fully charged. The second voltage detecting circuit (C26) is connected electrically to the voltage control circuit (C25) and the external dc power supply unit (C21). The second voltage detecting circuit (C26) controls the voltage control circuit (C25) to deactivate the dc-to-dc power converter (C22) when voltage of the external dc power supply unit (C21) drops below a minimum level. The stabilizer (C27) is connected electrically to the external dc power supply unit (C21) and serves to stabilize the output voltage from the external dc power supply unit (C21).

Figure 9:
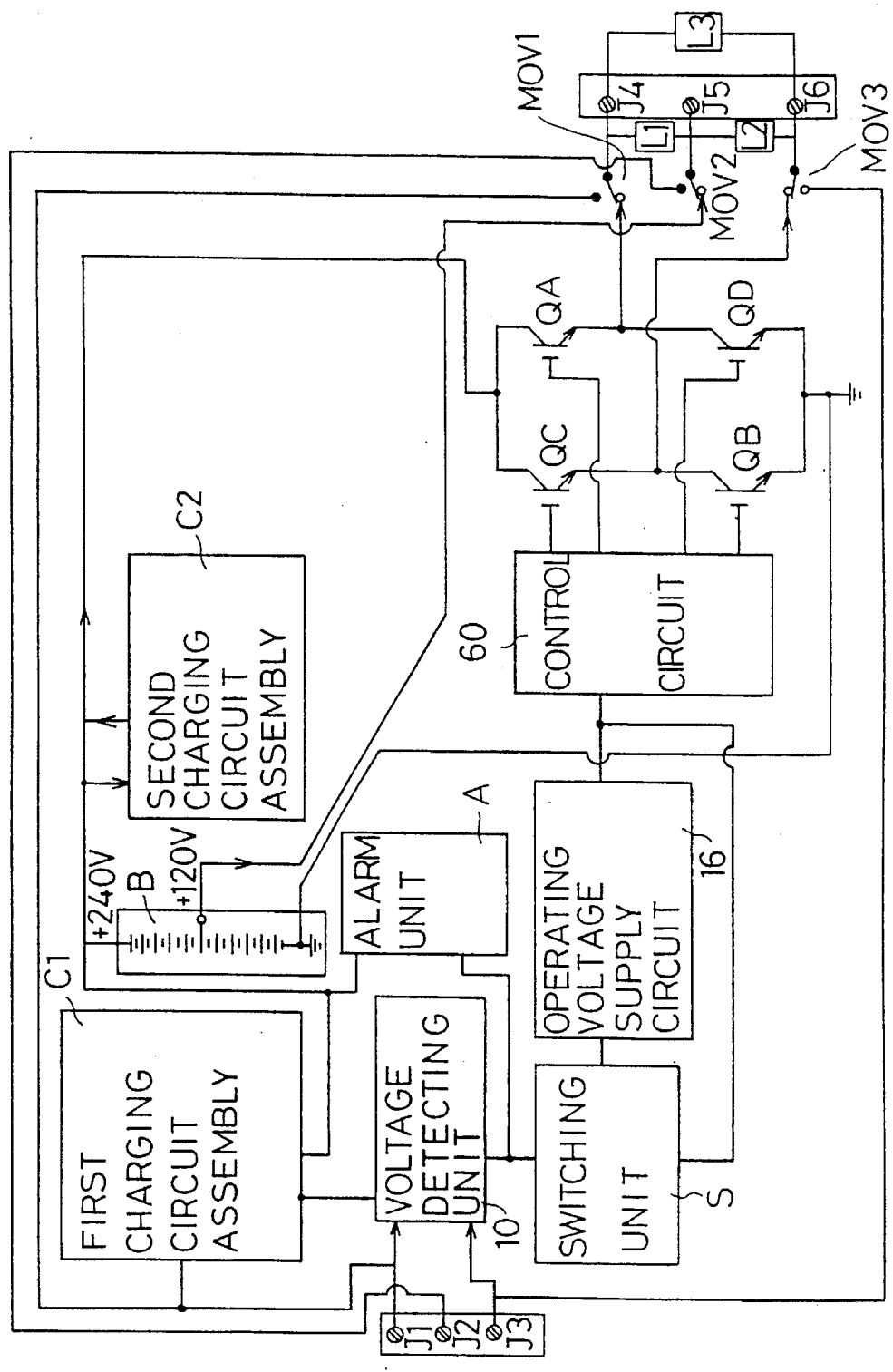
FIG. 9 is a schematic block diagram similar to that of FIG. 1, an ac load being connected between two of the three output terminals of the ac power supply unit according to the present invention.

Referring to FIG. 9, an ac load (L1,L2,L3) is connectable selectively between any two of the output terminals (J4,J5, J6). In operation, supposing the ac load (L1) is connected between the first and second output terminals (J4 and J5), and supposing the line power is present, the movable contacts (MOV1,MOV2,MOV3) connect the first output terminal (J4) to the first terminal (J1) of the ac outlet, the second output terminal (J5) to the second terminal (J2) of the ac outlet and the third output terminal (J6) to the third terminal (J3) of the ac outlet. At the same time, the dc voltage supply unit (B) is charged by the first charging circuit assembly (C1) until the dc voltage supply unit (B) is fully charged. If the line power is interrupted, the voltage detecting unit 10 will enable the switching unit (S) to control the movable contacts (MOV1,MOV2,MOV3) to connect the first output terminal (J4) to the emitter terminal of the first voltage-controlled switch (QA) and the collector terminal of the fourth voltage-controlled switch (QD), the second output terminal (J5) to the center tap terminal of the dc voltage supply unit (B), and the third output terminal (J6) to the emitter terminal of the third voltage-controlled switch (QC) and the collector terminal of the second voltage-controlled switch (QB). The operating voltage supply circuit 16 supplies the operating voltage (V4) to the first pulse generating circuit means 61 of the control circuit 60 such that the control circuit 60 controls the first and second voltage-controlled switches (QA and QB) to conduct and the third and fourth voltage-controlled switches (QC and QD) to be in a cut-off state during the high cycle of the predetermined frequency cycle, and controls the third and fourth voltage-controlled switches (QC and QD) to conduct and the first and second voltage-controlled switches (QA and QB) to be in a cut-off state during the low cycle of the frequency cycle, thereby providing a first ac voltage output between the first and second output terminals (J4 and J5). It should be noted that a second ac voltage output will be provided between the second and third output terminals (J5 and J6) when the ac load (L2) is connected between the second and third output terminals (J5 and J6), and a third ac voltage output will be provided between the first and third output terminals (J4 and J6) when the ac load (L3) is connected between the first and third output terminals (J4 and J6). The second ac voltage output is in phase with the first ac voltage output. The third ac voltage output is equal to a sum of the first and second ac voltage outputs. In the present embodiment, the first and second ac voltage outputs are 110 V, and the third ac voltage output is 220 V.

When the ac power supply unit of the present invention is used outdoors, and when the voltage of the dc voltage supply unit (B) drops below a minimum level, the dc voltage supply unit (B) can be charged by the second charging unit (C2) through the external dc voltage supply unit (C21), such as an automobile battery.

It should be appreciated that if there is any abnormal voltage or current condition present at the voltage-controlled switches (QA,QB,QC,QD) during the operation of the ac power supply unit, the protecting circuit means 67 will deactivate the corresponding actuating circuit means 63,64, 65,66 so as to cut off the corresponding voltage-controlled switches (QA,QB,QC,QD) in order to prevent the latter from burnout and short-circuit. In addition, since the second disabling signal is generated when the control voltage is larger than the predetermined reference voltage signal (VREF2,VREF4,VREF6) for a predetermined time interval, an ac load (not shown), which has a large initial current, can be used with the ac power supply unit of the present invention.

Accordingly, the ac power supply unit of the present invention has the following advantages:

1. The ac power supply unit can provide two 110 V ac voltage outputs or a 220 V ac voltage output so that it can be used in numerous applications.

2. Since the ac power supply unit does not employ a high power transformer as an inverter, the efficiency thereof is thus increased.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An ac power supply unit for supplying power to an ac load, said ac power supply unit comprising:

first, second and third output terminals, said load being adapted to be connected to selected ones of said first and second output terminals, said first and third output terminals, and said second and third output terminals;

a dc voltage supply unit for supplying a high dc voltage output, said voltage supply unit having a positive terminal, a center tap terminal connected electrically to said second output terminal, and a ground terminal;

a first voltage-controlled switch interconnecting said positive terminal of said dc voltage supply unit and said first output terminal;

a second voltage-controlled switch interconnecting said third output terminal and said ground terminal of said dc voltage supply unit;

a third voltage-controlled switch interconnecting said positive terminal of said dc voltage supply unit and said third output terminal;

a fourth voltage-controlled switch interconnecting said first output terminal and said ground terminal of said dc voltage supply unit; and a control circuit connected electrically to said first, second, third and fourth voltage-controlled switches, said control circuit controlling said first and second voltage-controlled switches to conduct and said third and fourth voltage-controlled switches to be in a cut-off state during a high cycle of a predetermined frequency cycle and further controlling said third and fourth voltage-controlled switches to conduct and said first and second voltage-controlled switches to be in a cut-off state during a low cycle of said frequency cycle, thereby providing a first ac voltage output measured across said first and second output terminals when said load is connected between said first and second output terminals, a second ac voltage output which is equal in magnitude to and which is in phase with said first ac voltage output and which is measured across said second and third output terminals when said load is connected between said second and third output terminals, and a third ac voltage output which is equal to a sum of said first and second ac voltage outputs and which is measured across said first and third output terminals when said load is connected between said first and third output terminals.

2. An ac power supply unit as claimed in claim 1, wherein said first, second, third and fourth voltage-controlled switches are transistors.

3. An ac power supply unit as claimed in claim 2, wherein said control circuit includes:

a first pulse generating circuit means for generating a first high frequency pulse signal and a second high frequency pulse signal which is out of phase with respect to said first high frequency pulse signal;

a second pulse generating circuit means for receiving said first and second high frequency pulse signals, said second pulse generating circuit means generating a first high frequency sub-signal and a second high frequency sub-signal from said first high frequency pulse signal, and a first high frequency sub-signal and a second high frequency sub-signal from said second high frequency pulse signal, said first high frequency sub-signal generated from said first high frequency pulse signal being out of phase with respect to said first high frequency sub-signal generated from said second high frequency pulse signal, said second high frequency sub-signal generated from said first high frequency pulse signal being out of phase with respect to said second high frequency sub-signal generated from said second high frequency pulse signal;

a first actuating circuit means connected electrically to said second pulse generating circuit means and said first voltage-controlled switch, said first actuating circuit means receiving said first high frequency sub-signal generated from said first high frequency pulse signal and generating a first low frequency actuating signal which has a frequency equal to that of said predetermined frequency cycle for activating said first voltage-controlled switch;

a second actuating circuit means which is connected electrically to said second pulse generating circuit means and said second voltage-controlled switch, said second actuating circuit means receiving said second high frequency sub-signal generated from said first high frequency pulse signal and generating a second low frequency actuating signal which has a frequency equal to that of said predetermined frequency cycle for activating said second voltage-controlled switch;

a third actuating circuit means which is connected electrically to said second pulse generating circuit means and said third voltage-controlled switch, said third actuating circuit means receiving said first high frequency sub-signal generated from said second high frequency pulse signal and generating a third low frequency actuating signal which has a frequency equal to that of said predetermined frequency cycle for activating said third voltage-controlled switch, said third low frequency actuating signal being out of phase with respect to said first low frequency actuating signal; and a fourth actuating circuit means which is connected electrically to said second pulse generating circuit means and said fourth voltage-controlled switch, said fourth actuating circuit means receiving said second high frequency sub-signal generated from said second high frequency pulse signal and generating a fourth low frequency actuating signal which has a frequency equal to that of said predetermined frequency cycle for activating said fourth voltage-controlled switch, said fourth low frequency actuating signal being out of phase with respect to said second low frequency actuating signal.

4. An ac power supply unit as claimed in claim 3, wherein said first pulse generating circuit means includes:

a pulse generating unit for generating a first low frequency pulse signal and a second low frequency pulse signal which is out of phase with respect to said first low frequency pulse signal;

a wave shaping circuit connected electrically to said pulse generating unit, said wave shaping circuit shaping said first and second low frequency pulse signals into first and second generally saw-tooth like signals; and a modulating circuit connected electrically to said wave shaping circuit, said modulating circuit receiving said first and second generally saw-tooth like signals and generating said first high frequency pulse signal and said second high frequency pulse signal.

5. An ac power supply unit as claimed in claim 3, wherein said control circuit further includes a protecting circuit means which comprises:

a first comparing circuit connected electrically to one of said first, second, third and fourth voltage-controlled switches and said actuating circuit means corresponding to said one of said first, second, third and fourth voltage-controlled switches, said first comparing circuit comparing an emitter voltage present at said one of said first, second, third and fourth voltage-controlled switches with a first predetermined reference voltage signal and generating a first disabling signal to deactivate said actuating circuit means corresponding to said one of said first, second, third and fourth voltage-controlled switches when an excessive voltage condition is present at said one of said first, second, third and fourth voltage-controlled switches; and a second comparing circuit connected electrically to said one of said first, second, third and fourth voltage-controlled switches and said actuating circuit means corresponding to said one of said first, second, third and fourth voltage-controlled switches, said second comparing circuit including means for draining a portion of current through said one of said first, second, third and fourth voltage-controlled switches and for generating a control voltage corresponding to said drained portion of current, and means for comparing said control voltage with a second predetermined reference voltage signal and for generating a second disabling signal to deactivate said actuating circuit means corresponding to said one of said first, second, third and fourth voltage-controlled switches when said control voltage is larger than said second predetermined reference voltage signal for a predetermined time interval.

6. An ac power supply unit as claimed in claim 5, further comprising an operating voltage supply circuit which is connected electrically to said first pulse generating circuit means to supply an operating voltage thereto, said second comparing circuit being connected electrically to and controlling said operating voltage supply circuit to stop supply of said operating voltage to said first pulse generating circuit means so as to disable said first, second, third and fourth voltage-controlled switches when said excessive voltage condition is present at said one of said first, second, third and fourth voltage-controlled switches.

7. An ac power supply unit as claimed in claim 1, wherein said dc voltage supply unit is a rechargeable battery unit.

8. An ac power supply unit as claimed in claim 7, further comprising a charging circuit assembly which is connectable electrically to an ac outlet for charging said rechargeable battery unit, said charging circuit assembly includes:

a high voltage rectifying and charging circuit connectable to said rechargeable battery unit, said high voltage rectifying and charging circuit converting an ac voltage output from said ac outlet into a dc voltage output for charging said rechargeable battery unit; and a battery voltage monitoring circuit connected electrically to said high voltage rectifying and charging circuit and said rechargeable battery unit, said battery voltage monitoring circuit deactivating said high voltage rectifying and charging circuit when voltage of said rechargeable battery unit reaches a predetermined value.

9. An ac power supply unit as claimed in claim 8, wherein said ac outlet includes a first terminal to which said first output terminal is connectable electrically, a second terminal to which said second output terminal is connectable electrically, and a third terminal to which said third output terminal is connectable electrically, said first and second terminals having a first voltage output therebetween, said second and third terminals having a second voltage output therebetween, said first and third terminals having a third voltage output therebetween, said second voltage being in phase with said first voltage, said third voltage being equal to a sum of said first and second voltages, said ac power supply unit further comprising:

a voltage detecting circuit connectable electrically between said first and third terminals of said ac outlet; and a switching unit connected electrically to said voltage detecting circuit so as to connect selectively said first output terminal to said first terminal of said ac outlet, said second output terminal to said second terminal of said ac outlet and said third output terminal to said third terminal of said ac outlet when line power is present, and so as to connect said center tap terminal of said dc voltage supply unit to said second output terminal, said first and fourth voltage-controlled switches to said first output terminal and said second and third voltage-controlled switches to said third output terminal when the line power is absent.

10. An ac power supply unit as claimed in claim 9, further comprising:

an alarm unit connected electrically to said voltage detecting circuit and said rechargeable battery unit, said alarm unit generating a warning signal when the line power is interrupted and the voltage of said rechargeable battery unit drops below a minimum level.

11. An ac power supply unit as claimed in claim 7, further comprising a charging circuit assembly for charging said rechargeable battery unit, said charging circuit assembly including:

an external dc voltage supply unit for supplying a low dc voltage output;

a dc-to-dc power converter connected electrically to said external dc voltage supply unit for amplifying said low dc voltage output into a high dc voltage output;

a charging circuit unit connected electrically to said dc-to-dc power converter and said rechargeable battery unit so as to charge said rechargeable battery unit with said high dc voltage output;

a first voltage detecting circuit connected electrically to said rechargeable battery unit for detecting voltage level of said rechargeable battery unit; and a voltage control circuit connected electrically to said first voltage detecting circuit and said dc to dc power converter, said voltage control circuit unit being enabled to deactivate said dc-to-dc voltage converter when said rechargeable battery unit is fully charged.

12. An ac power supply unit as claimed in claim 11, wherein said charging circuit assembly further includes a second voltage detecting circuit connected electrically to said voltage control circuit and said external dc power supply unit, said second voltage detecting circuit controlling said voltage control circuit to deactivate said dc to dc power converter when voltage of said external dc power supply unit drops below a minimum level.

* * * * *